United States Patent [19]

Kumar et al.

[11] Patent Number: 5,608,741
[45] Date of Patent: Mar. 4, 1997

[54] FAST PARITY GENERATOR USING COMPLEMENT PASS-TRANSISTOR LOGIC

[75] Inventors: Sudarshan Kumar; Shyue L. Kuo; Chung Y. Yip, all of Aloha, Oreg.

[73] Assignee: Intel Corporation, Santa Clara, Calif.

[21] Appl. No.: 156,427

[22] Filed: Nov. 23, 1993

[51] Int. Cl.$^6$ .................................................. G06F 11/10
[52] U.S. Cl. ........................................ 371/49.1; 371/49.2
[58] Field of Search ................................. 371/49.1, 49.2, 371/48, 49.3, 50.1, 51.1, 22.1, 22.6, 70, 69.1, 22.2, 71

[56] References Cited

U.S. PATENT DOCUMENTS

| | | | |
|---|---|---|---|
| 3,591,786 | 7/1971 | Nelson | 235/160 |
| 3,697,949 | 10/1972 | Carter et al. | 340/146.1 |
| 3,838,393 | 9/1974 | Dao | 340/146.1 |
| 4,251,884 | 2/1981 | Baun, Jr. | 371/49 |
| 4,775,810 | 10/1988 | Suzuki et al. | 307/471 |
| 4,879,675 | 11/1989 | Brodnax | 364/738 |
| 5,023,480 | 6/1991 | Gieseke et al. | 307/448 |

*Primary Examiner*—Robert W. Beausoliel, Jr.
*Assistant Examiner*—Phung My Chung
*Attorney, Agent, or Firm*—Blakely, Sokoloff, Taylor & Zafman

[57] ABSTRACT

The present invention discloses a fast parity bit generator using 4-bit XOR cells implemented using complement pass-transistor logic. For $2^{2n}$ inputs, where n is an arbitrary positive integer, the parity bit is generated in n stages using only $$\sum_{i=1}^{n} 2^{2n-2i}$$

4-bit XOR cells. For $2^{2n+1}$ inputs, where n is an arbitrary positive integer, the parity bit is generated using $$\sum_{i=1}^{n} 2^{2n-2i+1}$$

4-bit XOR cells disposed in n rows and one 2-bit XOR cell disposed in the last row. The speed of operation of the XOR cells is further enhanced by using NMOS transistor logic within the XOR cells.

23 Claims, 6 Drawing Sheets

/ / 5,608,741

FAST PARITY GENERATOR USING COMPLEMENT PASS-TRANSISTOR LOGIC

FIELD OF THE INVENTION

The present invention relates to the design of parity generators that are used for error detection; and particularly to minimize the delay in generating a parity bit for a large number of data bits.

BACKGROUND OF THE INVENTION

Parity bits have long been used for error detection in the transmission of digital binary signals. The parity bit used can be one of two types, even or odd. In an even parity scheme, the parity bit is defined to be a 1 or 0 so that the number of bits with a value of 1 in the data and parity bits combined is even. In an odd parity scheme this total number of bits is made to be odd. Thus, the odd parity bit would be the complement of the even parity bit. For a data of 10110, the even parity bit is 1. The even parity bit may be obtained by XORing all the data bits. Thus, 1 XOR 0 XOR 1 XOR 1 XOR 0 would equal 1. Obtaining the complement of this value would be the odd parity.

A parity bit of the data bits to be transmitted is typically computed at a sending end. The resultant parity bit is transmitted to a receiving end along with the data bits. The parity bit may be transmitted on the same channel as the data or using a separate channel. Within a computer system, a separate bit line is generally used to transmit the parity bit to enhance performance.

The receiving end checks the data received and verifies that the parity bit generated from this data is consistent with the parity bit that was generated at the sending end. If the parity bit generated is not consistent with the parity bit received from the sending end, transmission error is determined to have occurred. This provides limited error detection capabilities.

Typical prior art parity generators have been built using 2-bit XOR cells based on CMOS technology. A 2-bit XOR cell accepts two bits on the input line and generates the XOR of the two bits on the output line. A parity generator for generating parity bit for eight input bits is shown in FIG. 1. The parity generator comprises of seven 2-bit XOR cells disposed in three rows. Four cells 101–104 are disposed in a first row. Each of these cells (ex. 102) accepts two input bits (ex. 110, 111 for the cell 102) and generates XOR of these bits on the corresponding output line (Ex. 117). The input lines of cell in the subsequent stages are coupled to output lines of the cells in the previous stage. Thus each of these blocks are cascaded to the next stage. The output 122 of the 2-bit XOR cell 107 in the last stage will be the XOR of all the input bits on input lines 108–115. The parity bit for eight ($2^3$) bits is generated in three delay stages. In general, a parity generator with $2^n$ inputs would require n delay stages. Delay of this magnitude is not acceptable to the high performance microprocessors that use wider bus bandwidth and high clock speeds. What is required is a high-speed parity generator that computes the parity bit in lesser number of delay stages and thus in lesser amount delay-time.

SUMMARY AND OBJECT OF THE INVENTION

The present invention provides a fast parity generator by using predominantly 4-bit XOR cells. In a parity generator designed for $2^{2n+1}$ (odd power of two) input bits, where n is an arbitrary positive integer, the last stage would have only two input bits available. This invention uses a 2-bit XOR cell in the last stage. This further minimizes the overall delay of the parity generator. A parity generator for $2^{2n+1}$ input bits would thus have n stages of 4-bit XOR cells and one 2-bit XOR cell in the last stage. Further, the parity generator for $2^{2n+1}$ inputs would have only $$\sum_{i=1}^{n} 2^{2n-2i+1}$$

4-bit XOR cells.

On the other hand, a parity generator for $2^{2n}$ (even power of 2) input bits, where n is an arbitrary positive integer, would only have n stages of 4-bit XOR cells. Further, the number of 4-bit XOR cells used for a $2^{2n}$-bit parity generator is $$\sum_{i=1}^{n} 2^{2n-2i}$$

The 2-bit and 4-bit XOR cells in the present invention are implemented using complement pass-transistor logic (CPL). The cells accept input bits and their complement values on input lines and generate parity bit and the complement value of the parity bit on the output lines in one delay stage. Thus the 4-bit XOR cell has eight input lines and two output lines. The eight input lines correspond to the four input bits and the respective complement values. Similarly, the 2-bit XOR cell has four input lines and two output lines. The 2-bit XOR cells cause only half of the delay as the 4-bit parity generators. The XOR cells are implemented using the NMOS transistors. Since PMOS transistors are not used, this results in lower capacitance. Lower capacitance contributes to speed improvements in the individual cells.

According to one embodiment of the present invention, a 128-bit ($2^7$ i.e. odd power of 2) is disclosed. This includes forty-two 4-bit XOR cells and one 2-bit XOR cell. The 4-bit XOR cells are disposed in three stages. The 2-bit XOR cell is located in the last stage. Four input bits each are coupled to the input lines of the thirty two 4-bit XOR cells in the first stage. The input lines of cells of subsequent stages are coupled to the output lines of the cells in the previous stages. Thus, in the second stage we have eight cells and in the third stage only two cells. The output lines of the two cells in the third stage are coupled to the input lines of the 2-bit XOR cell. The output of the 2-bit cell will have the parity bit of the 128-bits of input coupled to the cells in the first stage.

According to another embodiment of the present invention, a 64-bit parity generator is disclosed. This generator includes only twenty-one 4-bit XOR cells implemented in three delay stages. The interconnection of the XOR cells is similar to that in the 128-bit parity generator. Four input bits each are coupled to input lines of each of the sixteen 4-bit XOR cells in the first stage. The output lines of these cells are coupled to the input lines of the four 4-bit XOR cells disposed in the next stage. The output lines of these four XOR cells are coupled to the one 4-bit XOR cell in the last stage. The parity bit of the sixty four input bits is generated on the cell output line of the XOR cell in the last stage.

Due to the reduced number of stages and the fast CPL technology, the delay time in the parity generator is minimized. Because of the dense CPL layout and significantly less number of cells to be placed, layout complexity and area requirements are also minimized.

BRIEF DESCRIPTION OF THE DRAWINGS

In the foregoing specification, the invention has been described with reference to specific exemplary embodiments thereof. It will, however, be evident that various modification and changes may be made thereto without departing from the broader spirit and scope of the invention as set forth in the appended claims. The specifications and drawings are, accordingly, to be regarded illustrative rather than restrictive.

DETAILED DESCRIPTION

A high speed parity generator constructed using four-bit XOR cells is disclosed. In the following description, numerous specific details, such as number of bits of inputs to the generator, are set forth in order to provide a thorough understanding of the invention. It will be obvious, however, to one skilled in the art that these specific details need not be used to practice the present invention. In other instances, other well-known details have not been described in detail in order to avoid obscuring the present invention.

Figure 1:
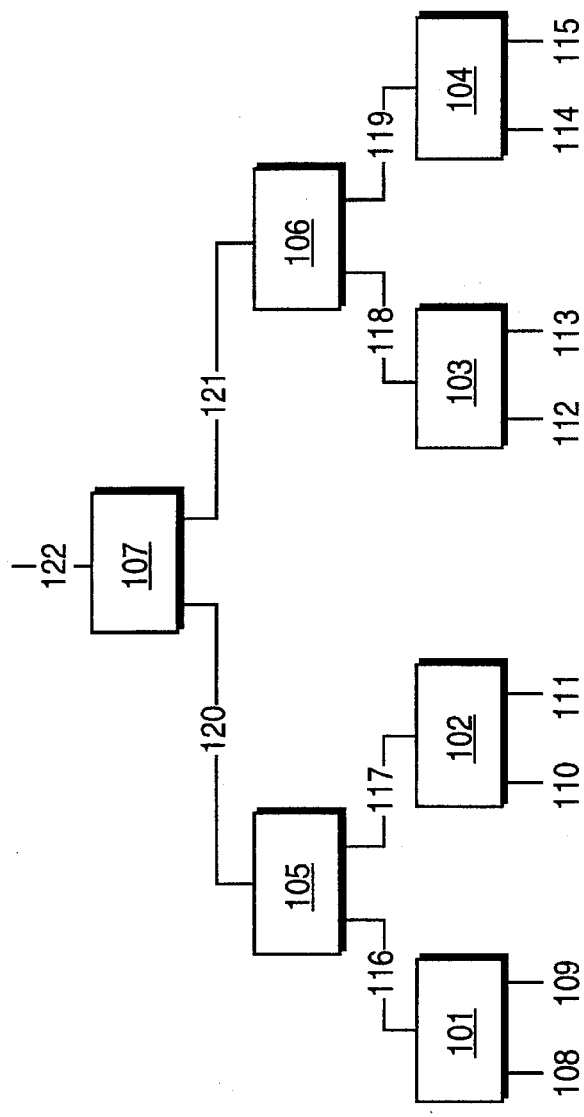
FIG. 1 shows a prior art parity-generator using two-bit XOR cells.
Figure 2:
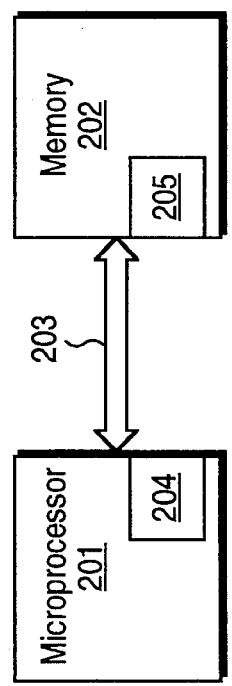
FIG. 2 shows an example of a configuration in a computer system where an embodiment of the present invention has been used.

FIG. 2 discloses an example of a configuration in a computer system where the preferred embodiment of the present invention may be used. In FIG. 2 is shown a micro-processor 201 and an external memory 202. These devises include high-speed parity generators 204 and 205 respectively. The micro-processor 201 and the memory 202 are coupled by means of a bus 203. The bus 203 includes channels to carry address information, data bits, parity bit and other control signals.

When micro-processor 201 has data to be transmitted to memory 202, parity generator 204 is used to compute a parity bit of the corresponding large number of bits. These bits and the parity bit are transmitted over bus 203. The memory unit 202 receives these bits. The parity generator 205 computes the parity bit for the bits received. If the parity bit computed in parity generator 205 is not the same as parity bit generated by parity generator 204, a transmission error is determined to have occurred.

Similarly, when memory 202 has data ready to send to microprocessor 201, the parity generator 205 generates the parity bit of the bits to be transmitted. The data and parity bits are transmitted over bus 203. The micro-processor 201 receives the data bits and the parity bit transmitted. The parity generator 204 generates the parity bit for the bits received. If the two parity bits are not the same, a transmission error is determined to have occurred. Though the application of the preferred embodiment has been described in reference to one configuration, it will be obvious to one skilled in the art that the preferred embodiment can be used in many other configurations without departing from the spirit of the present invention.

Figure 3:
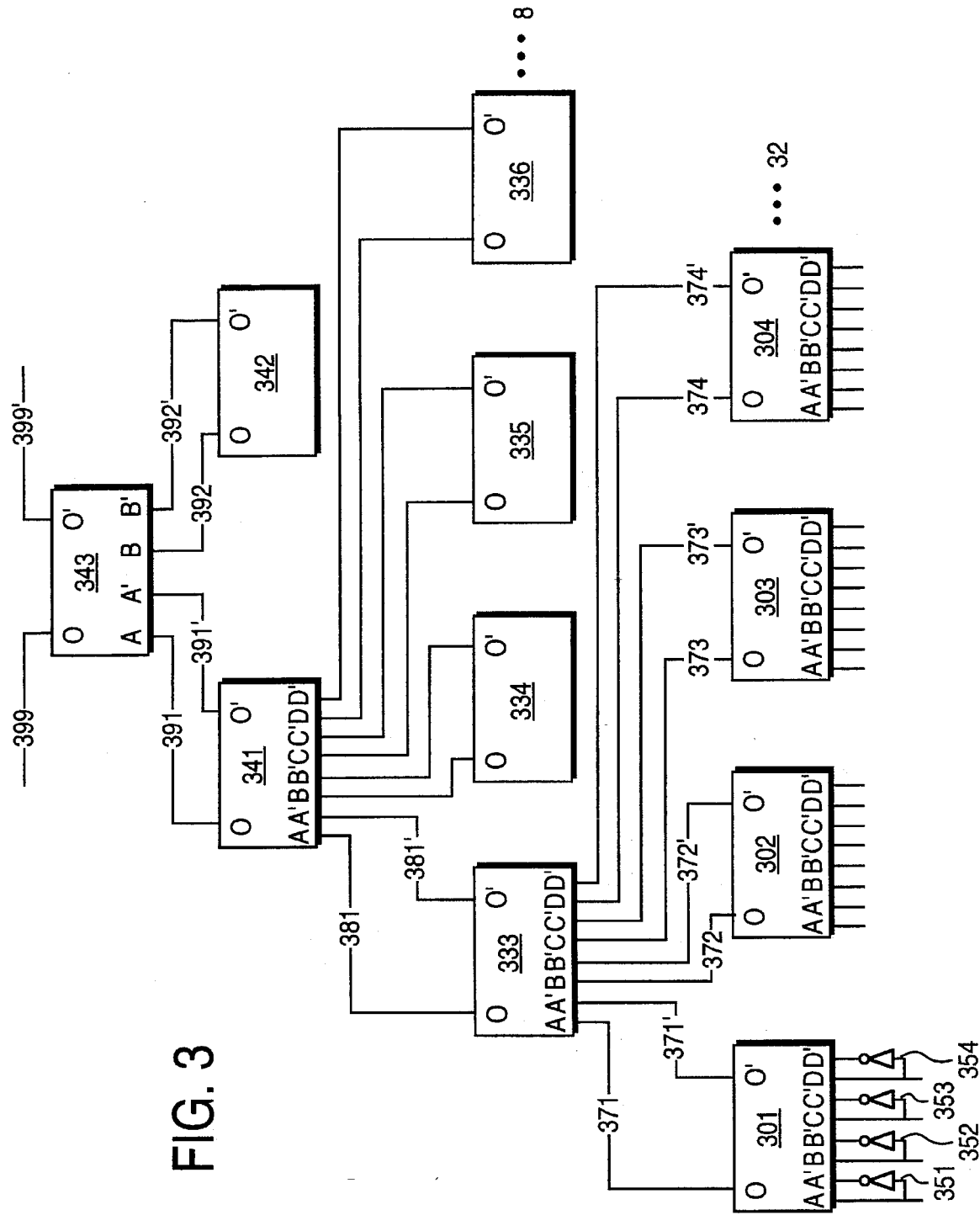
FIG. 3 shows a 128-bit parity generator built using forty-two 4-bit XOR cells and one 2-bit XOR cell.

A block diagram of one embodiment of the present invention is shown in FIG. 3. In this embodiment, a 128-bit ($2^7$) parity generator is shown. This illustrates the case for a parity generator for $2^{2n+1}$ inputs (odd power of 2), where n is a positive integer. This parity generator is constructed using forty-two 4-bit XOR cells and one 2-bit XOR cell. The 128-bit parity generator has four stages. The inputs to the generator connect to the first stage and the output is generated from the last stage. As shown towards the bottom of FIG. 3, the first stage consists of thirty-two 4-bit XOR cells (301 to 332). Similarly the second stage has eight (333 to 340) and the third stage two 4-bit XOR cells (341 and 342). The last stage has only one 2-bit XOR cell (343).

Both the 4-bit and 2-bit XOR cells are implemented using complement pass transistor logic(CPL). Each of the 4-bit XOR cells in FIG. 3 has eight input lines A', A, B, B', C', C, D', D and two output lines O and O'. In this application, A' is to be treated as the complement of A. The 4-bit XOR cells receive four input bits on the four input lines A, B, C, D and their respective complements on A', B', C', D'. The 4-bit cell generates the XOR of the four input bits and complement of the XOR bit on the output lines. On the other hand, the 2-bit XOR cell has four input lines A, A', B and B' and two output lines O and O'. It accepts two input bits on input lines A, B and their respective complements on A', B' and generates the XOR of the two input bits and the complement of the XOR value on the output lines O and O'.

Thus the 128-bit parity generator in FIG. 3 has thirty-two 4-bit XOR cells in the first stage corresponding to the one hundred and twenty eight input bits. Each of the cells in the first stage accept four input bits each on the input lines A, B, C, and D. The inverters 351 to 354 accept the four input bits and provide the corresponding complements on the output lines. These output lines are coupled to input lines A', B', C' and D' of cell 301. The other cells in the first stage also similarly accept four input bits and their respect complements with the inverters providing the complement values (not shown in the figure). The 4-bit XOR cell 301 generates the XOR output on cell output line 371 in one stage delay. The complement value O' of the output O is available on cell output line 371' at the same time.

The input lines of cells of subsequent stages are coupled to output lines of cells in the previous stages. Thus, in FIG. 3, line 371' couples cell output line O' of cell 301 to cell input line A' of cell 333. The cell output line O of cell 301 is coupled to cell input line A of cell 333. The output lines 0 and 0' of cells 302, 303 and 304 are coupled to other input lines B, B', C, C', D and D' of cell 333. Thus, output line O of cell 333 will have the XOR of the values on cell output line O of cells 301–304. This is available in one stage delay. The output lines O of cells 301–304 in turn have the XOR value of four each of the input bits. Thus, the XOR value of the input bits to cells 301–304 is present on output line O of cell 333 in two stage delays. The complement of XOR value is present on output line O' of cell 333.

The output lines of remaining cells 305 to 332 in first stage are coupled to input lines of cells 334 to 340 that are disposed in the second stage in a similar manner. The output lines of cells 333 to 336 are coupled to input lines of 4-bit XOR cell 341 that is disposed in the third stage. Similarly output lines of cells 337 to 340 are coupled to input lines of cell 342 in the third stage. Each stage generates output in one delay-stage.

Thus, the third stage contains only two 4-bit XOR cells. This is true of the n-th stage of a $2^{2n+1}$ (i.e. odd power of 2)

cell parity generator constructed using 4-bit input cells. The present invention employs 2-bit XOR cell in the last stage. This minimizes the delay time by generating the XOR output of the two bits in half the time as a 4-bit XOR cell that is used in prior stages. Thus the overall latency between the availability of inputs and generation of output using the parity generator is further reduced. The output thus generated on cell output line O of the 2-bit XOR cell is the parity bit of the 128-bits of input in the first stage. This takes a total of three full-delays and one one-half delay.

In general, for a parity generator for $2^{2n+1}$ input bits, where n is a positive integer, there are n stages of 4-bit XOR cells and one 2-bit XOR cell in the final stage. The total number of 4-bit XOR cells for a $2^{2n+1}$ input parity generator is given by the formula:

$$\sum_{i=1}^{n} 2^{2n-2i+1}$$

The number of 4-bit XOR cells in a stage is given by the corresponding value of i in the above equation.

Figure 4:
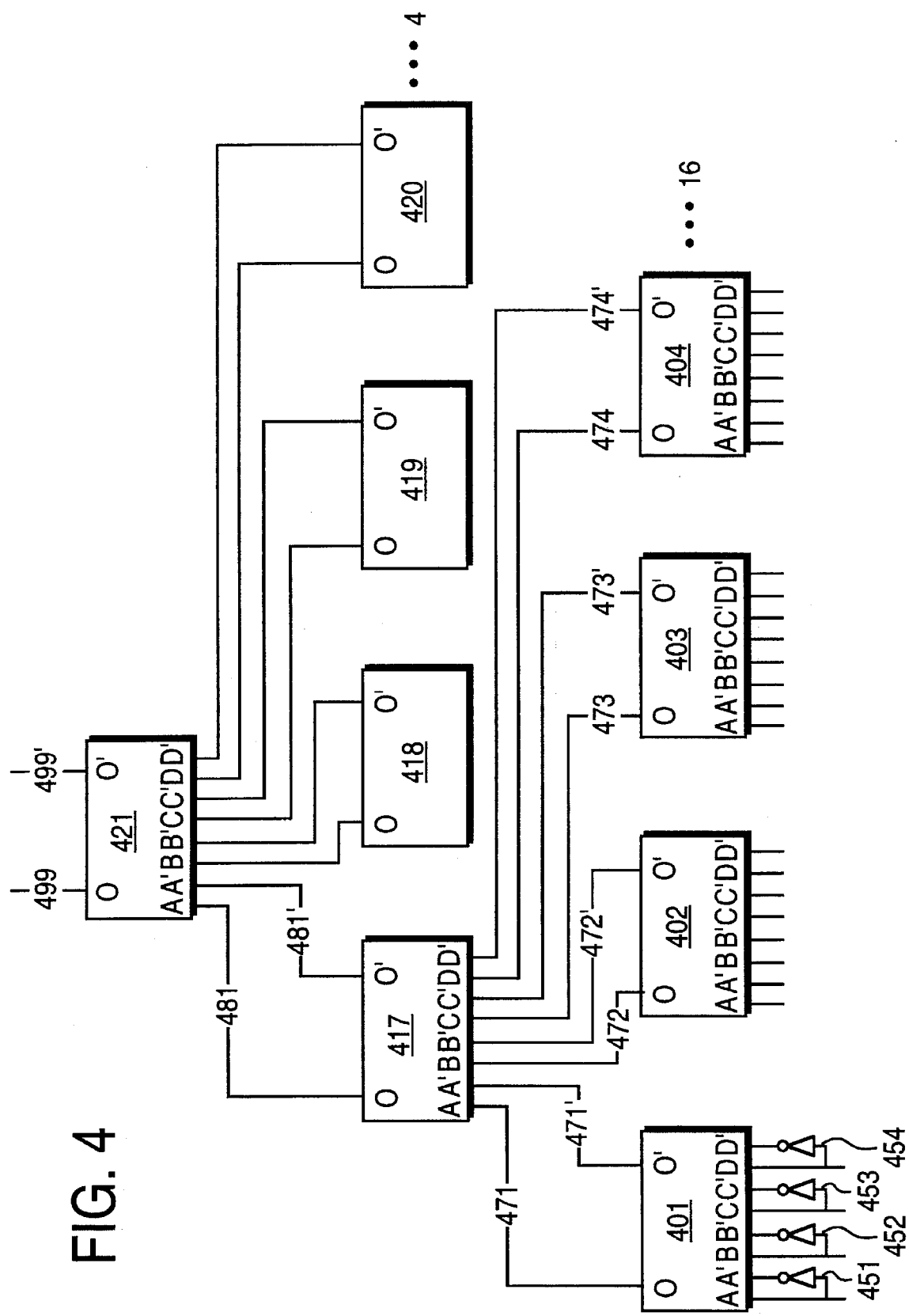
FIG. 4 is a block diagram of a 64-bit parity generator. This uses exclusively 4-bit XOR cells.

In FIG. 4 is shown another embodiment of the present invention. Here a 64-bit (i.e. $2^6$, 6 being even) parity generator is shown. This illustrates the case of a $2^{2n}$-bit generator. In the first stage of this generator, we have sixteen 4-bit XOR cells corresponding to the sixty-four input bits. The second stage has only four 4-bit XOR cells and the last stage one 4-bit XOR cell.

Similar to the 128-bit parity generator in FIG. 3, inverters 451 to 454 provide complement values of the four of the input bits to the input lines of cell 401. The cell 401 accepts these complement values and the corresponding bits and produces the XOR value and the complement of the XOR value on output lines O and O' respectively. Other cells 402 to 416 in the first stage operate similarly producing the XOR and the complement of the XOR value of four of the input bits. The output lines of cells 401 to 416 are coupled to input lines of cell 417 to 420. The output lines of cells 417 to 420 in turn are coupled to input lines of cell 421 in the last stage of the parity generator. The parity of the 64-bits of input is generated on cell output line O of parity generator 421.

The chief difference between a $2^{2n}$-bit parity generator (even power of 2) and the $2^{2n+1}$-bit (odd power of 2) parity generator is in the number of bits available in the last stage. A $2^{2n+1}$-bit generator according to the present invention will have only two input bits available while the $2^{2n}$-bit parity generator will have four bits available. Correspondingly 2-bit and 4-bit XOR cells are used in the respective cases. Using 2-bit XOR cell in the case of $2^{2n+1}$-bit generator is primarily intended to take advantage of the less number of inputs at the last stage and decrease the delay of this stage and thus of the parity generator as a whole. In general, a parity generator for $2^{2n}$ bits will have $$\sum_{i=1}^{n} 2^{2n-2i}$$

cells. These cells are laid out in n rows. The number of cells in each row is given by the corresponding value of i in the above equation.

Figure 5:
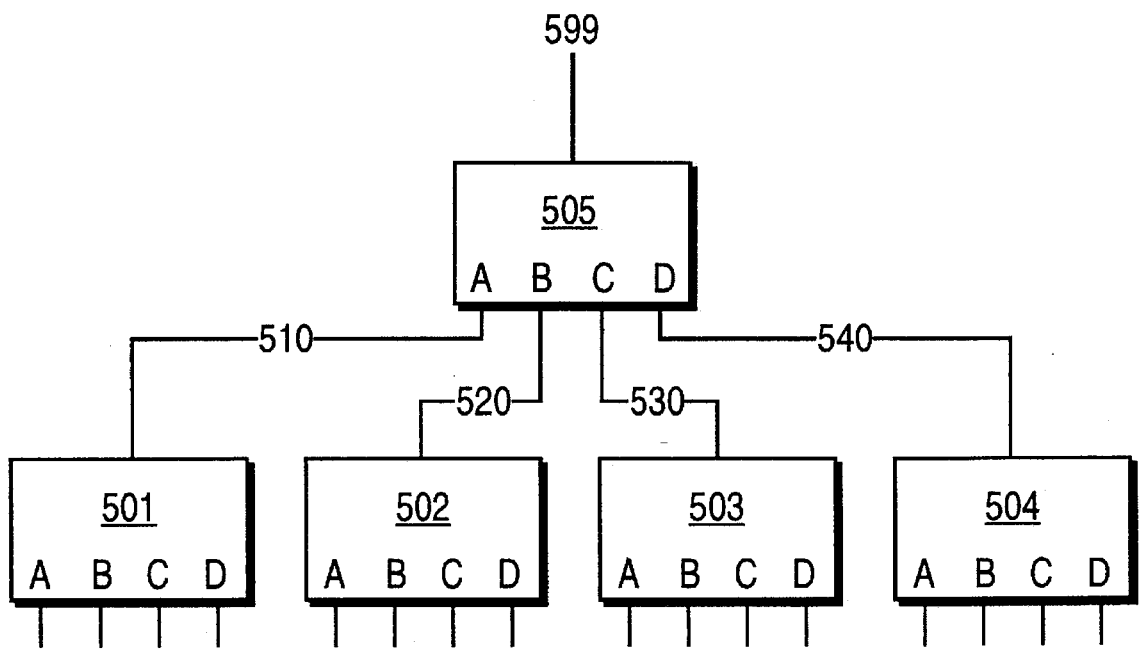
FIG. 5 is a block diagram of the general parity generator designed using 4-bit XOR cells but without complementary input/output values.

In FIG. 5, another embodiment of the present invention is shown. In this embodiment, the cells operate without using complementary input/output bits. Modifying the embodiment shown in FIG. 4 to implement this involves incorporating additional inverters into each of the cells. One skilled in the art will be able to make such a parity generator from what is disclosed.

Figure 6:
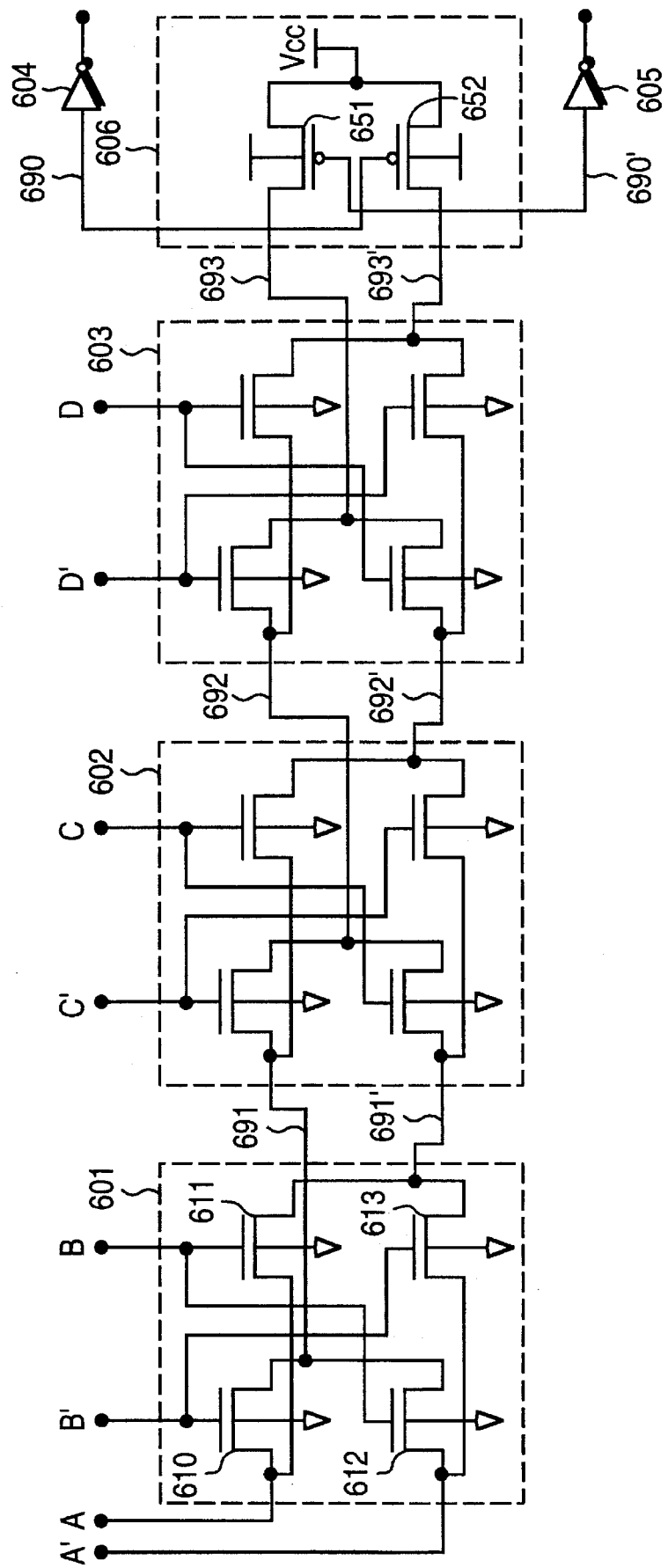
FIG. 6 is a circuit diagram of the 4-bit XOR cell used in the present invention. The 4-bit XOR cell accepts four input bits and complement values of the four bits and generates the XOR of the four input bits and complement of the XOR on the output lines.

Referring now to FIG. 6, the circuit diagram of a 4-bit XOR cell is shown. This consists of an NMOS logic tree network made of pass-transistors in three sub-stages 601, 602, 603, a pair of output inverters 604, 605 and a small PMOS cross-coupled latch 606. The sub-stage 601 of 4-bit XOR cell in FIG. 6 includes four NMOS-transistors 610, 611, 612 and 613. Input A couples to source gates of the two transistors 610 and 611 respectively. The input A' couples to source gates of transistors 612 and 613 respectively. The input B' couples to gates of transistors 610 and 613 respectively. Similarly input B couples to gates of transistors 611 and 612 respectively. The drains of transistors 610 and 612 are shorted to connect to output 691. The drain gates 611 and 613 are shorted and connect to output 691'.

When B is high, B' is low. Here transistors 610, 611, 612 and 613 are NMOS transistors. Since gates of transistors 611 and 612 are coupled to the high input B, these two transistors conduct. The gates of transistors 610 and 613 are connected to B', which is low. Hence transistors 610 and 613 are turned off. When 612 conducts, input voltage A' is available on the drain of transistor 612. Since output 691 is coupled to drain of transistor 612, input voltage A' is available on output 691. Since 610 is turned off due to the low value of B', output 691 is not affected by transistor 610. Thus when B is high and B' low, output 691 will have the voltage value corresponding to input A'.

The output 691' when B is high, is similarly explained. The transistor 611 conducts and 613 are turned off. Since input A couples to source of transistor 611, when transistor 611 conducts, the input voltage A is available on drain of transistor 611. Since the drain of transistor 611 is coupled to output 691', the input. A is available on output 691'. In this case output 691' is not affected by transistor 613 because 613 is turned off. Thus when B is high and B' low, the output 691' will have the voltage value corresponding to input A.

On the other hand, when B is low, B' is high. In this case, transistors 610 and 613 conduct as their corresponding gates are connected to high input B'. The transistors 611 and 612 are turned off due to low input B. Since 610 is conducting, the voltage level corresponding to A is available on drain of transistor 610. As output 691 is coupled to drain of transistor 610, the signal value A is available on output 691 of sub-stage 601. This output is not affected by transistor 612 since it is turned off.

Since transistor 613 conducts when B' is high, the voltage level corresponding to input A' is available on drain of transistor 613. This value is available on 691' immediately since the drain of transistor 613 is coupled to output 691'.

Thus output 691 is set to input A when B is low and A' when B is high. Thus if B=0 and A=0, output=A=0; if B=0 and A=1, output=A=1; If B=1 and A=0, output=A'=1; if B=1 and A=1, output=A'=0. This is an XOR implementation of the two inputs A and B. As discussed above, output 691' has complement of the value on 691. These outputs 691 and 691' serve as inputs to next sub-stage 602. These inputs are similar to the inputs A and A' to first sub-stage 601. The complementary inputs C and C' serve as the second set of inputs similar to B and B' in sub-stage 601.

The circuitry in sub-stage 602 is similar to that in sub-stage 601. The outputs 691 and 691' serve as inputs similar to inputs A and A' to sub-stage 601. The next set of inputs C and C' to the 4-bit XOR cell serve as the other set of inputs B, B' to sub-stage 602. The role of inputs C and C' is similar to the role of inputs B and B' for sub-stage 601. Thus the XOR of the bit value on 691 and C available on output 692. Since 691 has the XOR of A and B, 692 will have the XOR of A, B and C. 692' will have the complement of the value available on 692.

The outputs 692 and 692' serve as inputs to sub-stage 603. D and D' serve as the other set of inputs to sub-stage 603.

The result is that output 693 will have the XOR of the bit value on 692 and D. Since 692 in turn is the XOR of A, B and C, 693 in effect will have the XOR of A, B, C and D. As before 693' will have the complement value of that on 693.

The circuit including cross-coupled PMOS transistors 651, 652 and voltage source Vcc is used to step-up the high value of the complementary outputs. This is necessary because the NMOS pass transistors logic have high output lowered by a Vt in each of the three sub-stages. In this circuit, output 693 and drain of transistor 651 are shorted and coupled to cell output line 690. The output 693 is further coupled to the gate of PMOS transistor 652. In a similar fashion, output 693' is coupled to cell output line 690', the gate of transistor 651 and drain of transistor 652. The voltage Vcc is coupled to the source terminals of transistors 651 and 652.

As is known well to one skilled in the art, the PMOS transistor conducts when gate is coupled to low voltage value and turned off when coupled to high value. Thus when 693 is high, transistor 652 is turned off due to the high value on its gate. At the same time, transistor 651 has a low value at its gate and is coupled to 693' which is low. When 651 is conducting, the voltage source Vcc steps up output 693 to Vcc.

In the case, where 693 is low and 693' high, transistor 651 is turned off. This is because the gate of transistor 651 is coupled to the high value available on 693'. On the other hand, transistor 652, being coupled to the low output on 693, is turned on. This causes the voltage source Vcc to be available at the drain of transistor 652. This steps up the high output available on 693' to Vcc at 690'.

Figure 7:
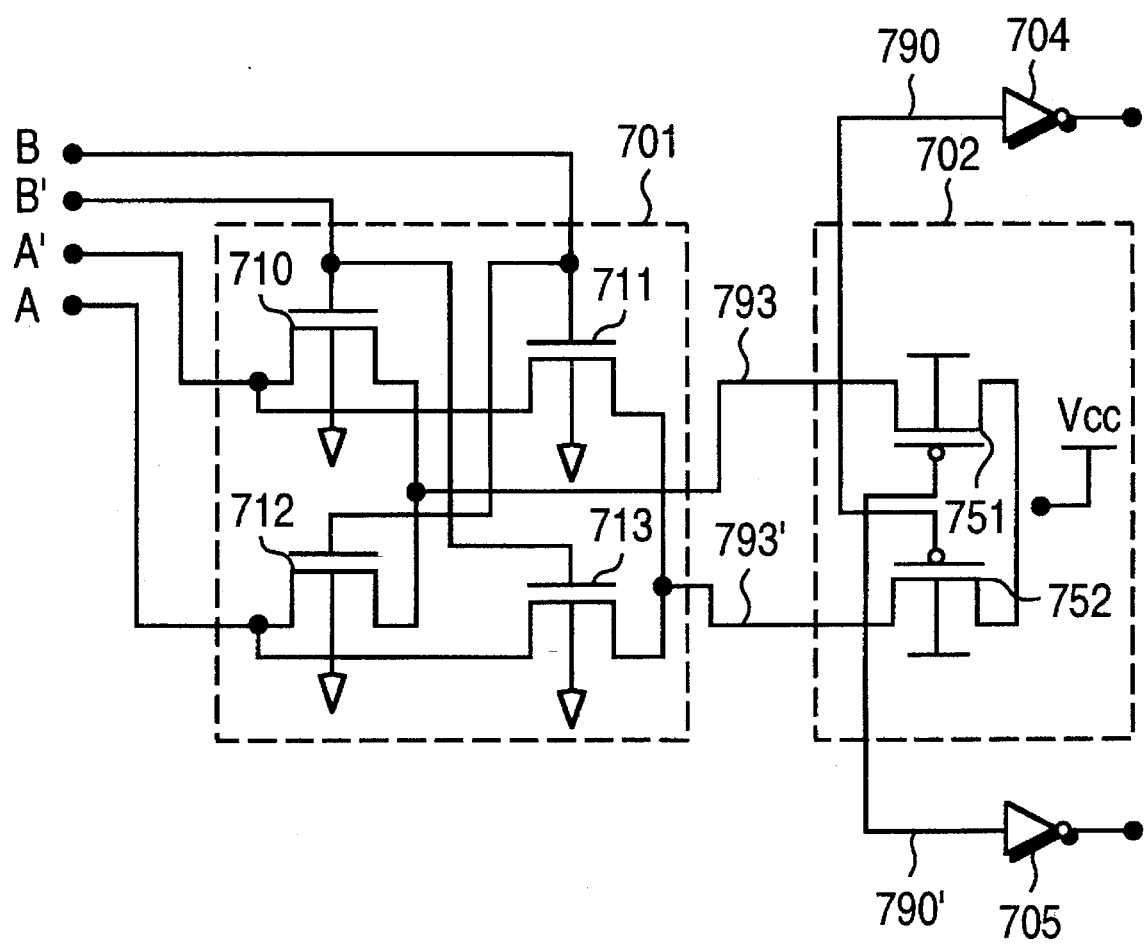
FIG. 7 is a circuit diagram of the 2-bit XOR cell.

With reference to FIG. 7, the circuit diagram of a 2-bit XOR cell is shown. Similar to 4-bit XOR cell, this cell includes a sub-stage 701 and the cross-coupled PMOS transistors with a power source Vcc to step-up the high output. The substage 701 in the cell takes as input the bits A, B and their respective complements A' and B'. This sub-stage generates the XOR of A and B on output 790. This works similar to the sub-stage 601 in FIG. 6. The complement of the XOR value is generated on 790'. The transistors 751 and 752 in conjunction with the voltage source Vcc, step-up the high value among the complement output values. Operation of both these circuits is explained in detail above.

In the basic cells, since only the NMOS cells are used in the sub-stages the generation of XOR cells happens fairly rapidly. The disadvantage that the voltage level of the high value may actually be less than Vcc is overcome by employing additional step-up circuitry after the last sub-stage. Since the sub-stages are based on NMOS, input capacitances and total device count is reduced and layout is dense. Fewer delay stages and lower input capacitance contribute to speed improvement. Because of the dense CPL layout and less amount of cells to be placed, layout complexity and area requirements are significantly reduced.

Thus a high-speed generator using 4-bit XOR pas-transistor logic cells is disclosed.

What is claimed is:

1. A computer system having a source unit with a plurality of input data bits, the source unit including a parity generator for computing a first parity bit and a complement of the first parity bit for the input data bits, the parity generator comprising:

a plurality of 4-bit XOR cells, each of the 4-bit XOR cells providing a plurality of input lines and output lines, each of the 4-bit XOR cells accepting a plurality of data bits and complements of the data bits on the input lines and producing an XOR value of the data bits and complement of the XOR value on the output lines, the plurality of 4-bit XOR cells arranged in three rows, wherein:

a first set of the 4-bit XOR cells are disposed in a first row, each of the first set of 4-bit XOR cells in the first row accepting the input data bits and their complement values on the input lines;

a second set of the 4-bit XOR cells disposed in a second row, input lines of the 4-bit XOR cells in the second row coupled to output lines of the 4-bit XOR cells in the first row; and a third set of the 4-bit XOR cells disposed in a third row, input lines of each of the 4-bit XOR cells in the third row coupled to output lines of the 4-bit XOR cells in the second row; and a 2-bit XOR cell providing four input lines and two output lines, the four input lines of the 2-bit XOR cell coupled to the output lines of the 4-bit XOR cells in the third row so as to generate the first parity bit and the complement of the first parity bit for the input data bits on the two output lines of the 2-bit XOR cell.

2. The computer system of claim 1 further comprising a transmission means coupled to the source unit for transmitting the input data bits and the first parity bit.

3. The computer system of claim 2 further comprising a destination unit coupled to the transmission means for receiving the input data bits and the first parity bit, the destination unit further including means to generate a second parity bit for the input data bits received, the destination unit determining that a transmission error has occurred if the first parity bit is not equal to the second parity bit.

4. The computer system of claim 3 wherein the 4-bit XOR cells and the 2-bit XOR cell comprise complement pass transistor logic.

5. The computer system of claim 4 wherein the transmission means is a bus.

6. The computer system of claim 5 wherein the source unit is a micro-processor and the destination unit is a memory unit.

7. The computer system of claim 5 wherein the :source unit is a memory unit and the destination unit is a micro-processor.

8. A computer system comprising:

a source unit with 128-bits of input data to be transmitted, the source unit including a means for generating a first parity bit for the 128-bits of input data;

transmission means coupled to the source unit for transmitting the 128-bits of input data and the first parity bit; and a destination unit coupled to the transmission means receiving the 128-bits of input data and the first parity bit, the destination unit including a parity generator generating a second parity bit for the 128-bits of input data received, the destination unit determining whether a transmission error has occurred if the first parity bit is different from the second parity bit, comprising:

a group of forty-two 4-bit XOR cells, each of the forty-two 4-bit XOR cells providing for eight input lines and two output lines, each of the forty-two 4-bit XOR cells accepting four data bits and corresponding complements of the four data bits on the eight input lines and producing an XOR value of the four data bits and complement of the XOR value on the two output lines, the forty-two 4-bit XOR cells arranged in three rows, wherein:

a group of thirty-two 4-bit XOR cells disposed in a first row, each of the thirty-two 4-bit XOR cells in the first row accepting four each of the 128-bits of input data and their complement values on the input lines;

a group of eight 4-bit XOR cells disposed in a second row, input lines of each of the eight 4-bit XOR cells in the second row coupled to output lines of four of the thirty-two 4-bit XOR cells in the first row; and a pair of 4-bit XOR cells disposed in a third row, input lines of each of the two 4-bit XOR cells in the third row coupled to output lines of four of the eight 4-bit XOR cells in the second row; and a 2-bit XOR cell providing for four input lines and two output lines, the input lines of the 2-bit XOR cell coupled to the output lines of the two 4-bit XOR cells in the third row so as to generate the second parity bit and the complement of the second parity bit for the 128-bits of input data on the two output lines of the 2-bit XOR cell.

9. The computer system of claim 8 wherein the 4-bit and 2-bit XOR cells are made of complement pass transistor logic.

10. The computer system of claim 9 wherein the transmission means is a bus.

11. The computer system of claim 10 wherein the source unit is a micro-processor and the destination unit is a memory unit.

12. The computer system of claim 10 wherein the source unit is a memory unit and the destination unit is a microprocessor.

13. A high-speed parity generator for generating a parity bit for $2^{2n}$ input bits and a complement of the parity of the $2^{2n}$ input bits, where n is an arbitrary positive integer, comprising:

means for generating a complement of the $2^{2n}$ input bits;

a plurality of 4-bit XOR cells corresponding to $$\sum_{i=1}^{n} 2^{2n-2i}$$

disposed in n rows, each of the plurality of 4-bit XOR cells having eight input lines and two output lines, the each of the plurality of 4-bit XOR cells accepting four input bits and corresponding complements complements of the four input bits on the eight input lines and generating an XOR value of the four bits and a complement of the XOR value on the two output lines in the form of high and low voltage outputs wherein:

$2^{2n}/4$ of the 4-bit XOR cells are disposed in a first row, each of the $2^{2n}/4$ of the 4-bit XOR cells in the first row accepting four input bits and the complement of the corresponding four input bits generated on the eight input lines; and a remainder of the 4-bit XOR cells disposed in (n−1) additional successive stages, input lines of each of the remainder of the 4-bit XOR cells in a stage coupled to the output lines of the remainder of the 4-bit XOR cells in the previous stage, until there is a single 4-bit XOR cell in a last stage;

wherein the parity of the $2^{2n}$ input bits and a complement of the parity of the $2^{2n}$ input bits is generated on the output lines of the 4-bit XOR cell in the last stage outputting the parity of the $2^{2n}$ input bits and a complement of the $2^{2n}$ input bits.

14. The high-speed parity generator of claim 13, wherein the 4-bit XOR cells are comprised of complement pass-transistor logic.

15. The high-speed parity generator of claim 14 further comprising a means to step-up the high voltage outputs of the corresponding complements of the parity bit.

16. A high-speed parity generator for generating a parity bit for $2^{2n+1}$ data bits, where n is a positive integer, comprising:

a first means for receiving the $2^{n+1}$ data bits, the first means generating complement of the $2^{2n+1}$ data bits;

a plurality of 4-bit XOR cells corresponding to $$\sum_{i=1}^{n} 2^{2n-2i+1}$$

disposed in n stages, each of the plurality of 4-bit XOR cells having eight input lines and two output lines, each the 4-bit XOR cell accepting four data bits and the corresponding complements on the input lines and generating an XOR value of the four data bits and a complement of the XOR value on the two output lines in the form of high and low voltage outputs wherein:

$2^{2n+1}/4$ of the 4-bit XOR cells disposed in a first row, each of the $2^{2n+1}/4$ of the 4-bit XOR cells in the first row accepting four data bits and the complement of the corresponding four data bits;

a remainder of the 4-bit XOR cells disposed in (n−1) additional successive stages, the input lines of each cell in a stage coupled to the output lines of the 4-bit XOR cells of the previous stage, until there are two 4-bit XOR cells in a last 4-bit XOR cell stage; and a 2-bit XOR cell having four input lines and two output lines, the output lines of 4-bit XOR cells in the last 4-bit XOR stage coupled to the input lines of the 2-bit XOR cell so that the parity of the $2^{2n+1}$ data bits and a complement of the parity of the $2^{2n+1}$ data bits are generated on the output line of the 2-bit XOR cell in the last stage.

17. The high-speed parity generator of claim 16, wherein the 2-bit XOR cell and 4-bit XOR cells comprise complement pass-transistor logic.

18. The high-speed parity generator of claim 17 further comprising a means to step-up the high voltage outputs of the corresponding complements of the parity bit.

19. A high-speed parity generator receiving $2^{2n}$ inputs bits and generating a parity bit for the $2^{2n}$ input bits, where n is a positive integer, comprising:

a complement generator generating complements of the $2^{2n}$ input bits in the form of high and low voltage outputs;

a plurality of 4-bit XOR cells corresponding to $$\sum_{i=1}^{n} 2^{2n-2i}$$

disposed in n rows, each of the plurality of 4-bit XOR cells having eight input lines and two output lines, the each of the plurality of 4-bit XOR cells receiving four input bits and the corresponding complements of the four input bits received on the eight input lines and generating an XOR value on the two output lines in the form of high and low voltage outputs;

wherein $2^{2n}/4$ of the 4-bit XOR cells are disposed in a first row, each of the $2^{2n}/4$ of the 4-bit XOR cells in the first row receiving four input bits and the corresponding complement of the four input bits generated on the eight input lines; and A remainder of the 4-bit XOR cells disposed in (n−1) additional successive stages, input lines of each of the remainder of the 4-bit XOR cells in a stage being coupled to the output lines of the remainder of the 4-bit XOR cells in a previous stage until there is a single 4-bit XOR cell in the last stage;

wherein the parity of the $2^{2n}$ input bits and a complement of the parity of the $2^{2n}$ input bits are generated on the output lines of the 4-bit XOR cell in the last stage.

20. The high-speed parity generator of claim 19, wherein the 4-bit XOR cells comprise complement pass-transistor logic.

21. The high-speed parity generator of claim 20, wherein the 4-bit XOR cells operate on complementary input/output values.

22. A high-speed parity generator for generating a parity bit for $2^{2n+1}$ input bits, where n is a positive integer comprising:

an inverter circuit receiving the $2^{2n+1}$ input bits and generating a complement of the $2^{2n+1}$ input bits in the form of high and low voltage outputs;

a plurality of 4-bit XOR cells corresponding to $$\sum_{i=1}^{n} 2^{2n-2i+1}$$

disposed in n stages, each of the plurality of 4-bit XOR cells having eight input lines and two output lines and receiving four input bits and the corresponding complements on the input lines and generating an XOR value of the four data bits and a complement of the XOR value on the two output lines in the form of high and low voltage output lines wherein $2^{2n+1}/4$ of the 4-bit XOR cells are disposed in a first row, each of the $2^{2n+1}/4$ of the 4-bit XOR cells in the first row receiving four input bits and the corresponding complement of the four input bits;

a remainder of the 4-bit XOR cells is disposed in (n−1) additional successive stages, the input lines of each cell being in a stage coupled to the output lines of the 4-bit XOR cells of the previous stage until there are two 4-bit XOR cells in a final 4-bit XOR cell stage; and a 2-bit XOR cell having four input lines and two output lines, the output lines of 4-bit XOR cells in the final 4-bit XOR cell stage coupled to the input lines of the 2-bit XOR cell such that the parity of the $2^{2n+1}$ input bits and a corresponding complement of the parity of the $2^{2n+1}$ input bits are generated on the two output lines of the 2-bit XOR cell in the last stage.

23. In a high speed parity generator having an inverter circuit to generate complements of given bits, a plurality of 4-bit XOR cells corresponding to $$\sum_{i=1}^{n} 2^{2n-2i}$$

disposed in n rows, each of the plurality of 4-bit XOR cells having eight input lines and two output lines, wherein $2^{2n}/4$ of the 4-bit XOR cells are disposed in a first row, a remainder of the 4-bit XOR cells in (n−1) additional successive stages, input lines of each of the remainder of the 4-bit XOR cells in a stage being coupled to the output lines of the remainder of the 4-bit XOR cells in a previous stage until there is a single 4-bit XOR cell in the last stage, a method of generating a parity bit for $2^{2n}$ input bits, where n is a positive integer, comprising the steps of:

inputting 4 input bits;

generating complements of the $2^{2n}$ input bits in the form of high and low voltage outputs with the inverter circuit;

receiving four input bits and the corresponding complements of the four input bits by each of the plurality of 4-bit XOR cells on the eight input lines of each of the 4-bit XOR cells;

generating an XOR value of the four input bits in the form of high and low voltage outputs by each of the plurality 4-bit XOR cells on the two output lines of each of the 4-bit XOR cells; and generating the parity of the $2^{2n}$ input bits and a complement of the parity of the $2^{2n}$ input bits on the output lines of the 4-bit XOR cell in the last stage.

* * * * *